United States Patent Office 2,772,977
Patented Dec. 4, 1956

2,772,977

SPICE SUBSTANCE AND METHOD OF PREPARING SAME

Harry R. Ansel, Chicago, Ill., assignor to Wm. J. Stange Co., Chicago, Ill., a corporation of Illinois No Drawing. Application December 9, 1954,
Serial No. 474,299

17 Claims. (Cl. 99—140)

This invention relates to ground spice substances and to a method of preparing the same. More particularly, it relates to finely ground spice substances containing the constituents of the original spice material in the proportions in which they occur naturally, the substances being in a readily handled semi-dry powder form, and to a method of preparing such materials by grinding spice substances.

Spices and similar substances often are added to foods to add zest and palatability thereto by virtue of the effect of the spices and the like upon either or both of the senses of smell and taste. The degree to which each sense is affected varies to a marked degree with the different spice substances, and the resultant impression of flavor created by spices and the like is a combination of the sensations produced upon these two senses. Accordingly, it is of extreme importance to preserve and safeguard both the fragrance and the taste of spices and the like up to the time of final consumption.

Spices and the like are found in nature in many different forms, such as berries, bark, roots, and seeds. The components of these spice substances that provide the aromatic and flavorful qualities are present in various forms. In some such spices and the like oils and juices are present which can be extracted by the application of pressure with or without the aid of solvents. In other spice substances, the flavor-giving components are in the cells of the plant structure and they are very difficult to isolate from the fibrous material. It has been found that in the case of spice substances in which the components are in the cells, the components can be released for use by grinding the substances very finely. The degree of seasoning produced by the ground spice substances depends at least in some measure on the fineness of grind, and it has been found in general that the most desirable and effective results are obtained by reducing the particle size of the spice substances to 100 microns or less.

Grinding of spices with relatively high ether extract content such as nutmeg, mace, and cloves by conventional means and methods has left something to be desired. Spices of the aforesaid type become quite gummy when ground, forming a gummy paste which tends to stick to the grinding apparatus, limiting the degree of fineness which can be obtained by conventional methods. Accordingly, it is an object of this invention to provide a method of grinding high ether extract content spices such as nutmeg and the like which produces a usable finely divided product of dry or semi-dry character which renders the spices more efficient because it enables such spice substances as nutmeg to be ground finely.

A further object of this invention is to provide a high ether extract spice product ground in the presence of a fibrous material which is substantially more efficient than commercial ground nutmeg.

Another object of this invention is to provide a spice substance of the high ether extract content type which is finely ground and is of a useful character which does not tend to pack together in shipping.

A further object of this invention is to provide a method of grinding a relatively high ether extract content spice in the presence of fibrous material to produce a usable spice product which is readily handled and shipped.

More specifically, it is an object of this invention to provide a method of grinding a high ether extract content spice in the presence of an edible, fibrous material to produce a useful spice product which is highly efficient and which is readily handled and shipped, and which does not pack together.

In accordance with the principles of this invention, I propose the grinding of relatively high ether extract content spices such as nutmeg, mace, and cloves in the presence of an edible fibrous material, preferably of cereal origin to produce a pulverulent spice substance of a semi-dry powder-like character which is highly efficient and which is readily handled and does not pack together. The product is in a usable form immediately after it has been ground. It is extraordinarily difficult, if not impossible, to grind nutmegs and the like to a fineness less than 100 microns and to mix the ground spice product with an edible fibrous material inasmuch as the ground nutmegs and the like when ground to extremely fine particle size in accordance with known principles are in the form of an extremely gummy paste which is practically impossible to handle, or to mix with anything else. The gumminess of this paste causes the particles to stick together in such a manner that the total available surface area of the particles is not exposed, and the spice product is not fully effective.

Since the natural spice substances of commerce are generally in the form of comparatively large hard pieces, it is preferable to break up these relatively large pieces into comparatively small particles, for example, to a size of the order of that which will pass through a relatively coarse screen on the order of a 20 mesh to the inch screen. This initial subdivision is preferably accomplished in a grinder such as a hammer mill, though other types of grinders may be used if desired. Following the initial grinding in a hammer mill or the like, the ground spice material or substance is preferably transferred to the second grinding stage, and this second grinding stage preferably comprises a roll grinder of a type known in the art and usually having three or five rolls which are water-cooled. The rolls are driven so that the second turns faster than the first, and the third turns faster than the second, it being understood that any roll beyond three similarly turns faster than the roll preceding it. The difference in speed of the adjacent rolls produces a shearing action on material passing between the rolls. The composition to be ground on such a grinder must have a certain amount of tack in order to adhere to the rolls sufficiently to advance from one roll to the other. A roll grinder of this type results in grinding of the spice substances to a fineness less than about 100 microns.

The edible fibrous materials, such as wheat bran, oat hulls, corn hulls, and soy flour, occur in pieces that are substantially smaller and less hard than the spice substances. Therefore, it is preferable to mix the cereal or other fibrous plant material with the high ether extract content spices after the first grinding step in the hammer mill. However, it is within the contemplation of the invention that the edible fibrous materials might be ground in the hammer mill along with the spice.

In accordance with the preferred procedure, the spice substance such as nutmeg is first given a coarse grind in a hammer mill to a size which will pass a screen of about 20 mesh to the inch. The partially ground spice material then is put into a mixer such as a ribbon mixer or a pony mixer and edible fibrous material such as wheat bran is added up to 25% by weight of the coarsely ground spice substance. Thorough mixing takes only a few minutes. A ribbon or powder blender type mixer is satisfactory when the spice substance is comparatively dry, but when the spice substance contains an appreciable amount of moisture, the rotary type mixer, sometimes called a pony mixer, is used.

The resulting mixture then is ground in a water cooled roll grinder, and the ground spice product is scraped off the third or other higher numbered final roll of the roll grinder and is passed through the roll grinder a second and sometimes a third time. The spice substance may have to be passed through the roll grinder only once, but usually two or three passes will be necessary to produce a desired uniformly fine grind to obtain a condiment comprising a homogeneous mixture in which the particles of both the spice and the fibrous material have a fineness of less than about 100 microns, and preferably less than about 50 microns. When the grinding is continued to this extent, the particles are invisible to the naked eye when the product is rubbed out in a thin film on white paper. A more precise determination of particle size may be made by the use of a microscope. A particle size below 44 microns readily can be achieved by practicing the present invention, thereby insuring rupture of substantially all of the cells of the spice substance to release substantially all of the seasoning values to be effective in food products in which the spice substance is incorporated. In addition to the desirability of releasing all of the seasoning values of the spice substance, this extremely fine grinding renders the individual particles substantially invisible so that the substance can be incorporated as seasoning in light colored products packed in glass without adversely affecting the appearance of the product.

In order that the invention may be better understood, the following specific examples are given. However, these examples are to be construed as illustrative and not necessarily as limiting the scope of the invention.

Example I

Ten pounds of nutmegs is ground in a hammer mill provided with a 20 mesh screen. The coarse ground nutmegs are mixed with two and one-half pounds of wheat bran in a mixer.

The ground mixture is then passed through a water cooled three-roll grinder as described above, and is scraped off the third roll, and is returned to the first roll for two more passes through the roll grinder. After the third pass through the roll grinder the material is scraped off the third roll into a container. The product collected from the third roll of the grinder is of a semi-dry pulverulent character resembling a powder and readily handled and shipped without any packing together of the spice substance. Seven and one-half pounds of the resulting spice substance develops the same strength in many food products as 10 pounds of nutmegs ground to 20 mesh.

Example II

Ten pounds of mace is ground in a hammer mill as in Example I. Following Example I, the coarse ground mace is uniformly mixed with two and one-half pounds wheat bran, and the mixture then is passed through a water cooled three-roll grinder and is scraped off the third roll for two more passes through the roll grinder and finally into a container. The resulting spice product again is of a semi-dry pulverulent nature generally resembling a powder and easily handled without packing together of the substance. Seven and one-half pounds of this product develops the same strength in many food products as ten pounds of ordinary mace ground 20 mesh.

Example III

Ten pounds of cloves is ground in a hammer mill in accordance with Example I. The coarse ground cloves are mixed with two and one-half pounds of wheat bran and the mixture then is finish-ground in a water cooled roll grinder, and is scraped off the third roll for two more passes through the roll grinder and finally into a container. The material again is of a semi-dry pulverulent nature which is readily handled and shipped, and seven and one-half pounds develops the same strength in many food products as ten pounds of ordinary cloves ground to 20 mesh.

Example IV

Ten pounds of nutmegs is ground in a hammer mill in accordance with Example I. The coarse ground nutmegs are uniformly mixed with two and one-half pounds of oat hulls, and the resulting mixture then is passed through a water cooled three-roll grinder and is scraped off the third roll for two more passes through the roll grinder and finally into a container. The ground product is of a semi-dry pulverulent character and is easily handled and shipped. Seven and one-half pounds of this spice product develops the same effect in many foods as ten pounds of ordinary nutmegs ground to 20 mesh.

Example V

Ten pounds of nutmegs is ground in a hammer mill as set forth in Example I. The coarse ground product then is mixed with two and one-half pounds of corn hulls, and the mixture is fine ground in a water cooled three-roll grinder, and the finished product is scraped off the final roll for two more passes through the roll grinder and finally into a container. The finished product again is of a semi-dry pulverulent character which is readily handled and shipped without packing together of the material, seven and one-half pounds develops the same strength in many food products as ten pounds of ordinary nutmegs ground to 20 mesh.

Although certain examples have been given above, it is to be understood that my invention is applicable generally to spices having a relatively high ether extract content, and that the edible fibrous material although preferably of a cereal or farinaceous origin including the specific examples set forth above and also including soy flour, may be of other plant origin. The spice preferably is coarse ground before mixing with the edible fibrous material, but it is possible that they could be premixed before the coarse grinding. The final grinding must be carried out after mixing inasmuch as the spice when ground alone becomes so gummy that it is virtually impossible to handle or to mix with any material such as the edible fibrous material herein referred to. Oils and other liquids released from the spice substance upon grinding immediately are taken up by the fibrous material. The individual spice particles are kept from packing together so that they are thus rendered fully effective. Thus, the fibrous material incorporated in the mixture not only produces with the ground spice a product which is easily handled, but renders the spice more efficient. Accordingly, the spice product produced in accordance with this invention is one which is readily handled, which posseses all of the spice components in their natural proportions, and in which all of the spice elements are released and retained for utmost utilization of the components of the spice. The entire grinding process preferably is carried out at ordinary room temperature.

The product produced in accordance with the principles of this invention is in usable form after the milling operation has been completed. The product is not a simple mixture of micro-ground nutmegs with an edible fibrous material, but rather is an intimate admixture of micro-ground nutmegs or other spice of the character described with edible fibrous material produced in such manner that many of the components of the spice substance are incorporated in the fibrous material.

It is apparent that many widely different embodiments of this invention may be made without departing from the spirit and scope of the invention, and therefore it is not intended to be limited except as indicated in the appended claims.

I claim:

1. The method of making a spice composition from a spice substance as hereinafter defined, comprising grinding the solid components of the spice substance in the presence of a fibrous material, said spice substance being one which in the absence of said fibrous material grinds to a gummy consistency.

2. A spice composition comprising a fibrous material uniformly admixed with the constituents of a spice substance of a type having a high ether extract content, said spice constituents being of a fineness less than about 100 microns and being present in substantially the proportions in which they occur naturally.

3. A spice composition comprising a fibrous material uniformly admixed with the constituents of a spice substance of a type having a high ether extract content, said spice constituents being present in substantially the proportions in which they occur naturally, and said fibrous material being present in an amount up to about 25% by weight of said spice substance.

4. A spice composition comprising a finely ground fibrous material uniformly admixed with the finely ground constituents of a spice substance of a type having high ether extract content, said spice constituents being present in substantially the proportions in which they occur naturally.

5. A spice composition comprising a finely ground fibrous material uniformly admixed with the finely ground constituents of nutmeg, said nutmeg constituents being present in substantially the proportions in which they occur naturally.

6. A spice composition comprising a finely ground fibrous material uniformly admixed with the finely ground constituents of mace, said mace constituents being present in substantially the proportions in which they occur naturally.

7. A spice composition comprising a finely ground fibrous material uniformly admixed with the finely ground constituents of cloves, said clove constituents being present in substantially the proportions in which they occur naturally.

8. A spice composition comprising a finely ground fibrous material of cereal origin uniformly admixed with the finely ground constituents of a spice substance of high ether extract content, said ground spice constituents being present in substantially the proportions in which they occur naturally.

9. A spice composition comprising finely ground wheat bran uniformly admixed with the finely ground constituents of a spice substance of high ether extract content, said ground spice constituents being present in substantially the proportions in which they occur naturally.

10. A spice composition comprising finely ground corn hulls uniformly admixed with the finely ground constituents of a spice substance of high ether extract content, said spice constituents being present in substantially the proportions in which they occur naturally.

11. A spice composition comprising finely ground oat hulls uniformly admixed with the finely ground constituents of a spice substance of high ether extract content, said spice constituents being present in substantially the proportions in which they occur naturally.

12. A spice composition comprising a ground mixture of a fibrous material of cereal origin uniformly admixed with the constituents of a spice substance of high ether extract content, the constituents of the spice substance being ground to a fineness of less than about 100 microns, and the fibrous material being present in an amount up to about 25% by weight of the spice substance.

13. A spice composition as set forth in claim 12, wherein the spice substance comprises nutmegs.

14. A spice composition as set forth in claim 12, wherein the spice substance comprises mace.

15. A spice composition as set forth in claim 12, wherein the spice substance comprises cloves.

16. The method of making a composition comprising a spice of high ether extract content which spice when ground to a fineness of about 100 microns turns gummy, said method comprising coarse grinding said spice, mixing the coarse ground spice substance with a fibrous material, and grinding the resulting mixture to a fineness less than 100 microns.

17. A method according to claim 16 in which said fibrous material is an amount of fibrous cereal material ranging up to about 25% by weight of said spice substance.

References Cited in the file of this patent

UNITED STATES PATENTS

| 2,035,136 | Levinson et al. | Mar. 24, 1936 |
| 2,449,411 | Rapaport | Sept. 14, 1948 |
| 2,636,824 | Ansel | Apr. 28, 1953 |

OTHER REFERENCES

"The Journal of Industrial and Engineering Chemistry," vol. 8, No. 7, July 1916, page 609.